United States Patent [19]
Colbourne et al.

[11] Patent Number: 5,896,193
[45] Date of Patent: Apr. 20, 1999

[54] APPARATUS FOR TESTING AN OPTICAL COMPONENT

[75] Inventors: Paul Colbourne; Gary S. Duck, both of Nepean; Vasile Prunes, Ottawa; Carey M. Garrett, Kanata, all of Canada

[73] Assignee: JDS Fitel Inc., Nepean, Canada

[21] Appl. No.: 08/801,119

[22] Filed: Feb. 14, 1997

[51] Int. Cl.⁶ .................................................. G01B 9/00
[52] U.S. Cl. ............................................. 356/124; 356/125
[58] Field of Search ................................... 356/124, 125, 356/73.1, 345; 385/14

[56] References Cited

U.S. PATENT DOCUMENTS 4,410,268  10/1983  Tamaki ............................. 356/124

*Primary Examiner*—Frank G. Font
*Assistant Examiner*—Amanda Merlino
*Attorney, Agent, or Firm*—Neil Teitelbaum & Associates

[57] ABSTRACT

A method and apparatus of generating a test signal for broadcast to a plurality of locations for testing optical devices is disclosed. A tunable laser sweeps from a lower wavelength to a higher upper wavelength providing a test station with a variable input signal. A timing signal generated from the variable input signal is provided to the test station to determine the frequency of the variable input signal so that tests may be performed at several known wavelengths. Amplification is added to the system to provide sufficient power to the variable input signal and timing signal both split by a splitter to be provided to multiple test stations simultaneously.

17 Claims, 3 Drawing Sheets

Thr.=Threshold transmission level

APPARATUS FOR TESTING AN OPTICAL COMPONENT

FIELD OF THE INVENTION

This invention relates generally to test devices and more particularly to a distributed testing system providing the capability of testing a plurality of optical components at multiple sites.

There are several ways of testing an optical component for loss and other characteristics. For example, a single optical signal of known wavelength and amplitude can be launched into a component, and losses can be deduced from a signal measured at the output of the device. Alternatively, a plurality of signals can be launched into the device sequentially and similar measurements made for each wavelength. In a manufacturing and production environment, it is preferable to test devices over a range of wavelengths of interest as quickly as possible. Generally, a testing station for testing optical components requires a very costly tunable laser. In operation, these lasers are tuned to a plurality of wavelengths, one at a time, and have their output signal fed into a device under test (DUT). The purpose of providing a signal to a DUT at various wavelengths within a predetermined range of wavelengths, is to detect losses through the DUT at each or at several wavelengths of interest. Of course it would be possible to provide signals from several discrete lasers to a DUT, however, in a production environment, such a scheme would likely not be practicable. When using a tunable laser as mentioned above, it is preferred if electronic circuitry is provided to correlate an output response for the DUT with a particular wavelength of light propagating through the device at a particular instant in time.

Systems are currently known that employ a tunable laser in which the tuning mechanism stops at each wavelength to be tested. However, this process takes several minutes when a large number (i.e.>100) of wavelengths are to be measured. The wavelength accuracy is limited by the mechanical tolerances of the tuning mechanism.

It is an object of this invention to provide an apparatus for determining the wavelength of a tunable laser while it is tuning, so that the tuning mechanism does not have to stop at each wavelength, thus speeding up the measurement. The wavelength accuracy is not affected by the mechanical tolerances of the tuning mechanism.

It is an object of this invention, to provide a central system which generates signals for testing optical devices at a plurality of testing stations, remote from the central system.

It is a further object of the invention to provide a system having one tunable laser for generating a plurality of signals to a plurality of test stations simultaneously.

It is a further object of the invention to provide a system for testing a plurality of devices simultaneously.

It is a further object of the invention to provide an apparatus responsive to an input signal of varying wavelengths, for testing a plurality of devices at a plurality of locations.

STATEMENT OF THE INVENTION

In accordance with the invention there is provided, an apparatus for testing an optical component, comprising:

a) means responsive to a portion of a first optical signal that varies in wavelength, for providing a timing signal that corresponds to the first optical signal being at a predetermined wavelength, wherein another portion of the first optical signal or signal derived therefrom, is for being provided to the optical component;

b) a test station including:
means for deriving wavelength information relating to the first optical signal or signal derived therefrom from the timing signal and,
means for correlating test information with the derived wavelength information.

In accordance with the invention there is further provided, an apparatus for testing an optical component, comprising:

means responsive to a portion of a first optical signal that varies in wavelength, for providing a timing signal that corresponds to the first optical signal being at a predetermined wavelength, wherein another portion of the first optical is for being provided to the optical component under test; and, means for combining the timing signal with the first optical signal.

In accordance with another aspect of the invention there is provided, an method of generating a test signal for broadcast to a plurality of locations for testing optical devices, comprising the steps of:

a) generating a first laser signal that varies in wavelength from a first lower wavelength to a higher upper wavelength sweeping through a plurality of wavelengths therebetween;

generating a timing signal from a portion of the first laser signal that has information encoded therein for determining when the first laser signal is at a predetermined frequency;

providing the first laser signal and the timing signal to a test station;

deriving wavelength information relating to the first laser signal from the timing signal;

providing a portion of the first laser signal to an optical device for testing said device;

and, correlating test information with the derived wavelength information.

BRIEF DESCRIPTION OF THE DRAWINGS

Exemplary embodiments of the invention will now be described in conjunction with the drawings, in which.

DETAILED DESCRIPTION OF THE DRAWINGS

Figure 1:
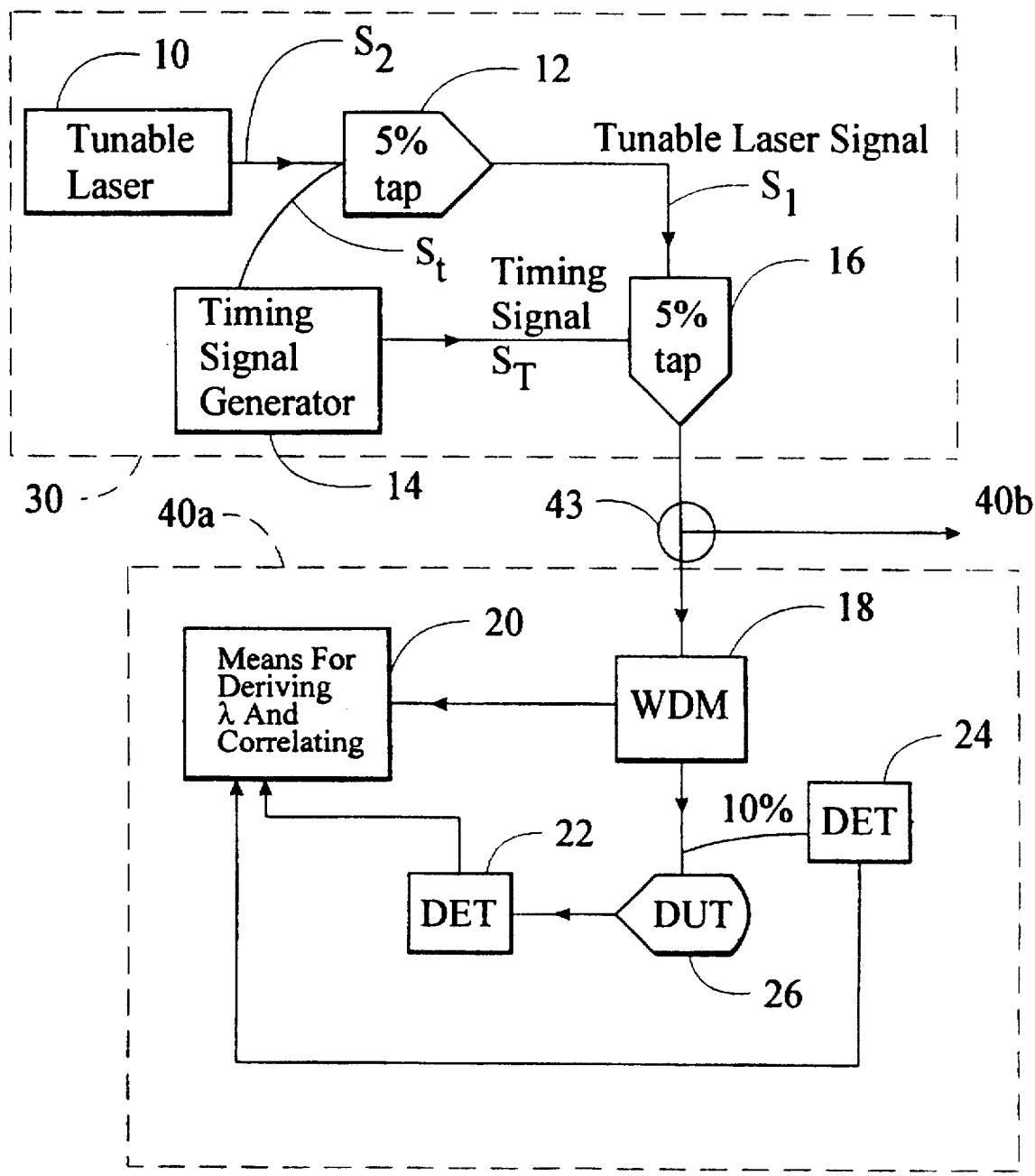
FIG. 1 is a schematic block diagram of a first embodiment of the invention wherein a first laser signal and timing signal generator block provide signals to a test station block for testing an optical device.

Turning now to FIG. 1, a high level block diagram is shown of a first embodiment of the invention of a test system 8 wherein a first block 30 of optical circuitry and components provides a variable wavelength optical signal for launching into a DUT 26 within a second block 40a. In the first block 30, the variable wavelength optical signal in the form of a tunable laser signal $S_L$ is combined with a timing signal $S_T$ for determining wavelength information relating to the tunable laser signal $S_L$. The purpose of separating the circuitry into these two blocks 30 and 40a is to isolate and separate two primary functions: firstly, that of producing a variable wavelength optical signal with an associated timing signal for providing timing information relating to the variable wavelength optical signal, and secondly, the function of testing the device or component of interest along with providing the necessary circuitry for doing so in response to the two signals $S_L$ and $S_T$. Furthermore, the separation into these two blocks has significant cost advantages as well. For example, by using a splitter 43 to split the variable wavelength optical signal along with its corresponding timing signal into two same signals, another test station 40b (not shown) identical to block 40a can be provided with test and timing signals. Since the most costly part of the entire system 8 is in the block 30 containing the tunable laser, this system obviates the requirement of providing duplication of the tunable laser to provide test signals to two or more separate test stations.

Referring now in more detail to the system 8, block 30 includes a tunable laser 10 capable of being tuned over a wavelength range of interest of 1520 nm to 1570 nm. The tunable laser 10 repeatedly varies its output starting at 1520 nm increasing continuously to 1570 nm. After reaching 1570 the laser it returns to 1520 nm and continues from 1520 nm again. Thus the laser sweeps across the wavelength range, and continues repeatedly. A 5% tap 12 is provided to receive the output signal $S_L$ from the laser, passing 5% to a timing signal generator 14, and passing 95% of the optical signal $S_L$ onwards to a means 16 of combining this signal with a timing signal $S_T$. The timing signal generator determines from the small portion of the output signal $S_L$, when the signal $S_L$ is at a predetermined wavelength, for example, when its wavelength is 1520 nm. Then the timing signal generator 14, generates the timing signal $S_T$ which indicates that the signal $S_L$ is at a wavelength of 1520 nm. At a subsequent time when the laser wavelength reaches the next wavelength of interest, for example 1520.01 nm, a subsequent pulse in the timing signal is sent indicating 1520.01 nm. As both of the signals $S_L$ and $S_T$ are combined by a coupling means 16, care is taken to ensure that the timing signal is at a wavelength that differs from the signal $S_L$ so that the data content of the signal $S_L$ is not affected. Essentially, the timing signal serves as a marker or indication which can be used by the block 40a, and more particularly the means for determining wavelength information 20 to calibrate the wavelength of the signal $S_L$ at specific times corresponding to the timing signal. Conveniently a splitter 43 is provided to split the signals $S_L$ and $S_T$ into other signals $S_L$ and $S_T$ that can be routed to one or more other test stations 40b, 40c . . . etc. (not shown). Of course alternatively, the timing signal could be an electrical signal distributed by electrical means.

The second block 40a includes means in the form of a WDM filter 18 for separating the composite signal $S_L$ and $S_T$ into two separate signals. The signal $S_T$ is provided to the means for determining wavelength information 20, which also receives information from detectors 22 and 24. Substantially the entire signal $S_L$ output from the filter 18 is provided to the DUT 26; a small portion, 10% is provided to the detector 24. The output signal from the DUT 26 is directed to the detector 22. In operation the detector 24 relatively determines the intensity of the input signal to the DUT 26 and provides this information to the means 20. The actual intensity or power measured at the output of the DUT 26 is provided by the detector 22 to the same means 20; thus the means 20 can calculate the loss through the DUT 26 and can determine the corresponding wavelength of the signal $S_L$ for that particular loss calculation, in dependence upon the timing signal. Since the timing signal indicates the instant the signal $S_L$ is at a wavelength of 1520 nm., a determination can be made as to the wavelength of the signal $S_L$ at other instants in time. An embodiment for realizing this function will be described in more detail with reference to FIG. 2.

Figure 2:
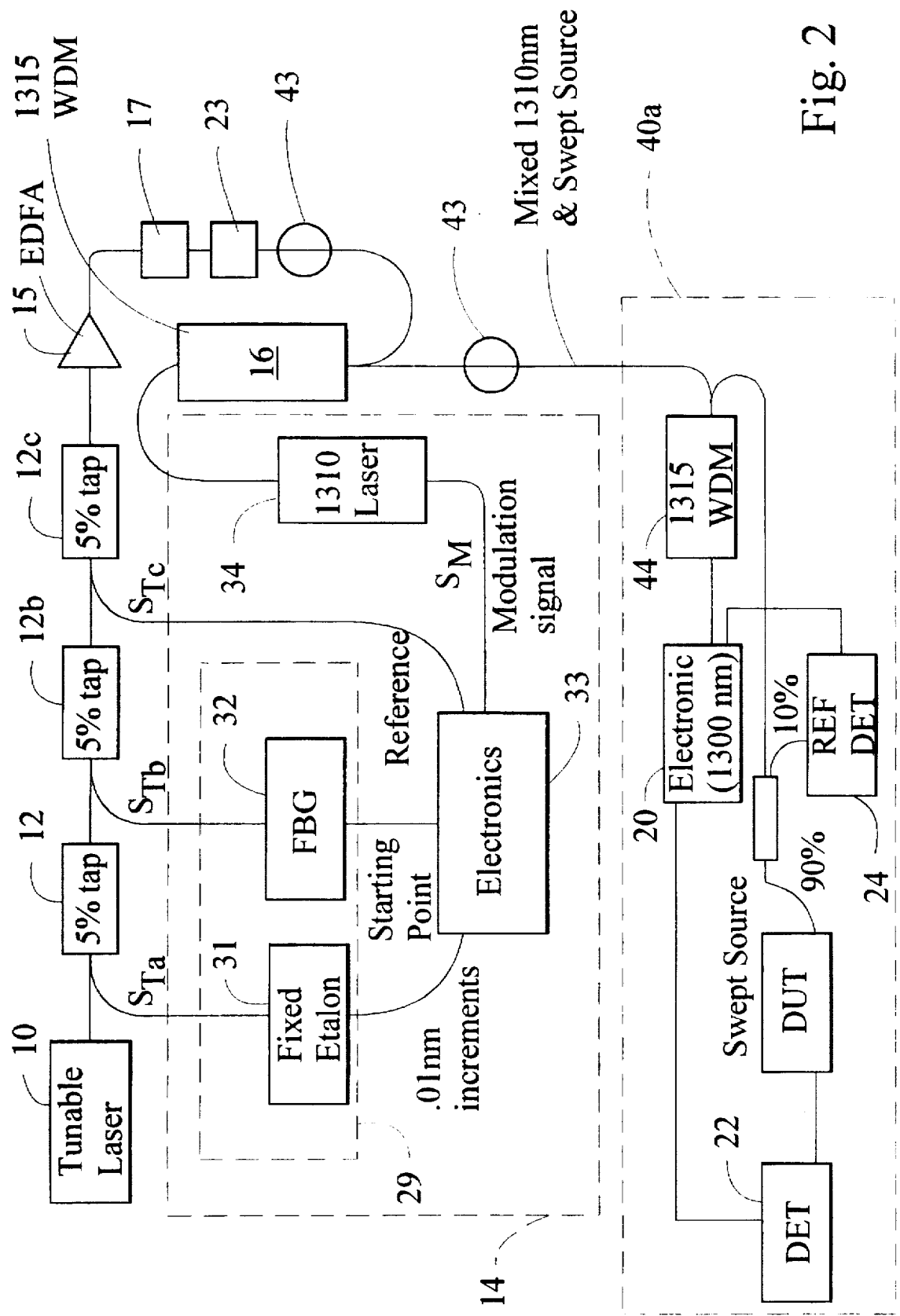
FIG. 2 is a schematic block diagram of a second embodiment of the invention wherein a first laser signal and timing signal generator block provided signals to multiple test stations.
Figure 4:
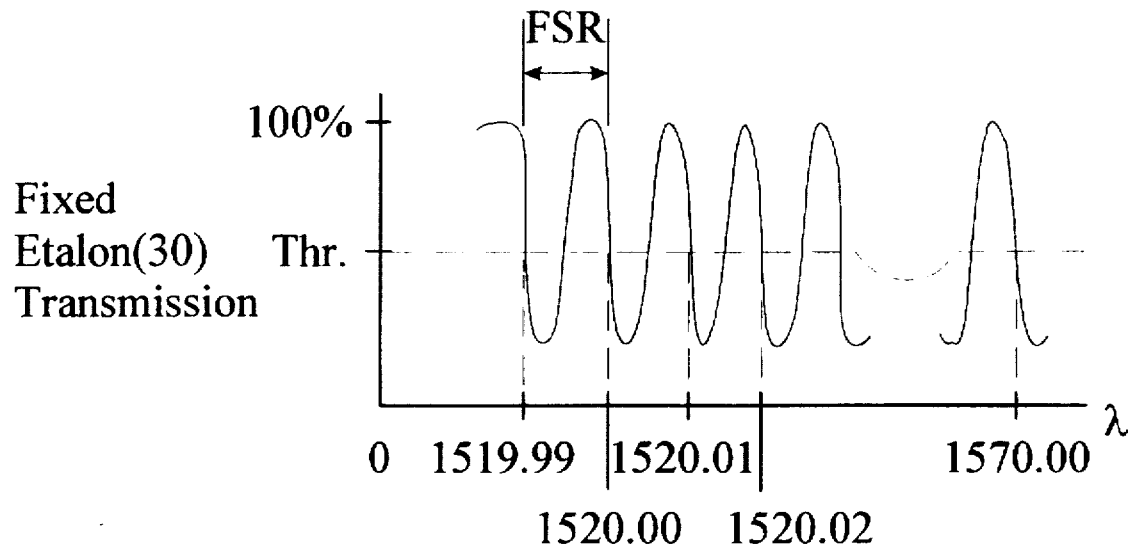

Referring now to FIG. 2, a small portion of an output signal $S_L$ of a tunable laser 10 is tapped by 5% optical taps 12, 12b and 12c, for providing three tap signals $S_{Ta}$, $S_{Tb}$, and $S_{Tc}$ which are provided to a timing signal generation circuit 14. Within this circuit 14, a fixed etalon 31, a fiber Bragg grating (FBG) 32 and electronic circuitry 33 provide a means of generating a pulsed modulation signal $S_M$ comprising a train of pulses having 0.01 nm increments in wavelength of the signal $S_L$. The first pulse in the train of pulses, derived from the output of the FBG 32 and the output of the fixed etalon 31, corresponds to the signal $S_L$ being at a wavelength of 1520 nm; the second pulse corresponds to the signal $S_L$ being at a wavelength of 1520.01 nm; the third pulse corresponds to the signal $S_L$ being at a wavelength of 1520.02 nm, and so on, and the last pulse in the train of pulses, corresponds to the to the signal $S_L$ being at a wavelength of 1570 nm; Since the input signal $S_T$ to the fixed etalon varies in wavelength, and the etalon is selected to have a free spectral range of 1.25 GHz or about 0.01 nm. within the range of 1520 to 1570 nm, the output signal of the fixed etalon 31 is a periodic signal. FIG. 4 shows the desired output characteristic of the etalon 31. The distance between etalon reflective surfaces is calculated as follows:

Etalon FSR[nm]=$\gamma^2$/2nd

Etalon FSR[GHz]=c/2nd where c=the speed of light; n=the refractive index of the material between the reflective surfaces; and d=the distance between etalon reflective surfaces.

Figure 3:
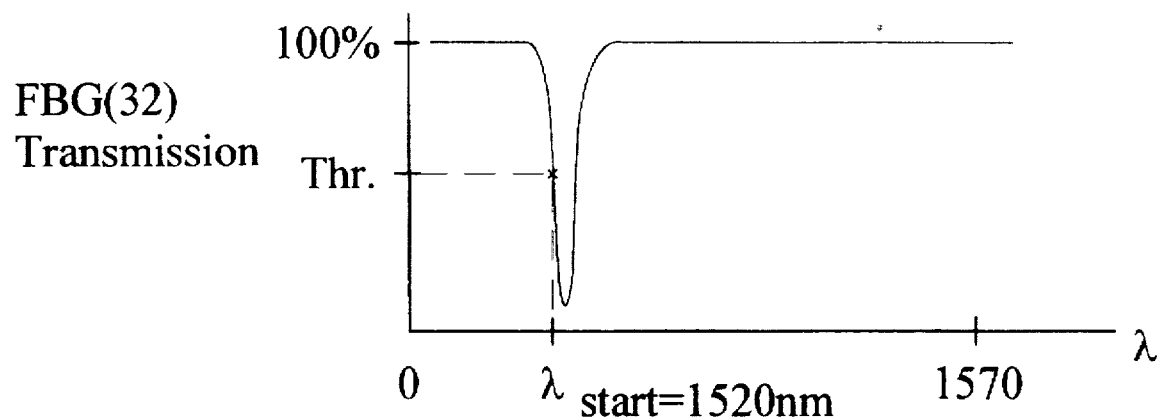
FIG. 3 is a graph showing the output characteristics of a fibre Bragg grating; and, FIG. 4 is a graph showing the output characteristics of an etalon in accordance with this invention.

The FBG 32 is designed to reflect the input signal when its wavelength is 1520 nm., thus providing an indication to the circuitry corresponding to a starting point, in the train of pulses. This is illustrated in FIG. 3 where at the threshold transmission level, the start is indicated to be at 1520 nm. The electronic circuit 20 in response to the periodic output from the etalon 31 and the indication of when the signal $S_L$ is at a wavelength of 1520 nm., generates the modulation signal $S_M$ which is provided to a 1310 nm. laser 34. In response to the signal $S_M$ the laser generates a train a pulses, at a wavelength of 1310 nm. having spaced apart in time, corresponding to 0.01 nm. increments of the tunable laser signal $S_T$. Thus, the modulation signal is converted to a 1310 nm. laser pulsed signal $S_{LP}$ having a wavelength significantly different from the signal $S_L$ which varies between 1520 and 1570 nm. Before the signals $S_{LP}$ and $S_L$ are combined, the signal $S_L$ is amplified by an erbium doped fibre amplifier (EDFA). The EDFA may be necessary to ensure that there is sufficient optical power at each test station to perform the loss measurement on the DUT. A tunable filter 17 tracks the laser wavelength, transmitting the laser signal but blocking the spontaneous emission of the EDFA or laser at wavelengths other than the laser wavelength.

A wavelength division multiplexor 16 combines the amplified signal $S_L$ and the signal $S_{LP}$ into a composite signal $S_L S_{LP}$ which are fed to a 1 by 8 splitter 43 thereby providing 8 test signals. Thus, 8 test stations 40a, 40b . . . 40h can be provided at different locations within a building, with the required signals and signal information with which to test optical devices. Using the device shown in FIG. 2, it takes approximately 1 second to test a DUT at a plurality of wavelengths from 1520 nm. to 1570 nm. in increments of about 0.01 nm which corresponds to approximately 5000 data points.

In the embodiment shown in the circuit 14 of FIG. 2, an etalon is used as a means of providing a periodic signal as the input signal sweeps from 1520 to 1570 nm. Of course the etalon may be substituted with other suitable interferometric means. Further the FBG 32 is used as a means of acquiring a relatively precise indication of its input signal being at 1520 nm. Once again, various other means can be envisaged for indicating when the input signal is at 1520 nm. The fixed etalon and FBG have been chosen in the preferred embodiment after considering cost and availability. Preferably, temperature stabilization means 29 are provided to ensure that the output of the characteristics of the etalon remain as constant as possible.

The timing signal $S_T$ need not be combined with the tunable laser signal $S_L$. Instead a second optical fiber, or a wire, can be use to transmit the timing signal to each test station. The signals are combined in the preferred embodiment to simplify the distribution of the signals among the test stations; or, alternatively, the tunable laser itself can be modulated to transmit the timing signal.

The laser signal $S_L$ can be distributed to many more than 8 test stations. The limiting factor is that sufficient optical power be present at detectors 22 and 24 to perform the loss measurement. If necessary, the laser signal $S_L$ could be split after 17, and re-amplified and split again. In this way an unlimited number of test stations can operate from one tunable laser (with multiple timing signals $S_T$ provided.)

In FIG. 2 an optional polarization state controller 23 is shown to control the polarization state of the laser signal $S_L$ transmitted to the DUT. By using this controller 23, the system can measure polarization dependent loss (PDL) at each wavelength. The controller 23 is set to one of 4 polarization states and one wavelength sweep is made, measuring the loss of the DUT at each wavelength. The controller 23 is then set to the second polarization state and a second wavelength sweep is made. At each wavelength, 4 polarization states can be used to calculate the average loss (over all polarization states) and PDL. The controller 23 can be placed directly after the tunable filter 17, thereby further economizing and obviating the need to have a polarization state controller 23 at each station.

Of course numerous other embodiments can be envisaged without departing from the spirit and scope of the invention.

What is claimed is:

1. An apparatus for testing an optical component, comprising:

a) means responsive to a portion of a first optical signal that varies in wavelength, for providing a timing signal that corresponds to the first optical signal being at a predetermined wavelength, wherein another portion of the first optical signal or signal derived therefrom, is for being provided to the optical component;

b) a test station including:

means for deriving wavelength information relating to the first optical signal or signal derived therefrom from the timing signal and, means for correlating test information with the derived wavelength information.

2. An apparatus as defined in claim 1, comprising at least another test station, said at least other test station including:

means for deriving wavelength information relating to the first optical signal from the timing signal and, means for correlating test information with the derived wavelength information.

3. An apparatus as defined in claim 1, further comprising a plurality of test stations, each including:

means for deriving wavelength information relating to the first optical signal from the timing signal and, means for correlating test information with the derived wavelength information.

4. An apparatus as defined in claim 1, further comprising:

a tunable laser for providing the first optical signal that varies in wavelength.

5. The apparatus as defined in claim 2, further comprising detector means for detecting at least one of light launched through the component, and light reflected from the component.

6. The apparatus as defined in claim 2, wherein the means responsive to the timing signal provided further includes means for determining wavelengths of the first optical signal at a plurality of instances in time.

7. The apparatus as defined in claim 2 comprising a plurality of taps for tapping the first optical signal and the timing signal, at least some of the taps each for providing the first optical signal and the timing signal to a test station as defined in.

8. An apparatus for testing an optical component, comprising:

means responsive to a portion of a first optical signal that varies in wavelength, for providing a timing signal that corresponds to the first optical signal being at a predetermined wavelength, wherein another portion of the first optical signal is for being provided to the optical component under test; and, means for combining the timing signal with the first optical signal.

9. An apparatus as defined in claim 8, wherein the means for providing a timing signal comprises an interferometric device for providing a periodic signal in response to the first optical signal that varies in wavelength.

10. An apparatus as defined in claim 9, wherein the means responsive to a portion of a first optical signal that varies in wavelength, for providing a timing signal that corresponds to the first optical signal being at a predetermined wavelength comprises means for providing an indication of when the first optical signal is at the predetermined wavelength.

11. An apparatus as defined in claim 10, further comprising means for modulating the timing signal.

12. An apparatus as defined in claim 1, wherein the means responsive to a portion of a first optical signal that varies in wavelength, for providing a timing signal that corresponds to the first optical signal being at a predetermined wavelength comprises interferometric means for providing a periodic output signal in response to an input signal that varies in wavelength.

13. An apparatus as defined in claim 4, further comprising means for amplifying the first optical signal.

14. An apparatus as defined in claim 4, further comprising means for filtering the first optical signal, to transmit the laser wavelength and attenuate light at other wavelengths.

15. An apparatus as defined in claim 4, further comprising means for measuring polarization dependent loss of the device under test.

16. An apparatus as defined in claim 4, further comprising means for filtering the first optical signal to allow a light of a predetermined polarization to pass therethrough to the device under test.

17. A method of generating a test signal for broadcast to a plurality of locations for testing optical devices, comprising the steps of:

a) generating a first laser signal that varies in wavelength from a first lower wavelength to a higher upper wavelength sweeping through a plurality of wavelengths therebetween;

generating a timing signal from a portion of the first laser signal that has information encoded therein for determining when the first laser signal is at a predetermined frequency;

providing the first laser signal and the timing signal to a test station;

deriving wavelength information relating to the first laser signal from the timing signal;

providing a portion of the first laser signal to an optical device for testing said device;

and, correlating test information with the derived wavelength information.

* * * * *